United States Patent

Swerdlow

[15] 3,646,245
[45] Feb. 29, 1972

[54] LIQUID-COOLED BUS CONTAINING A DISCONNECTING LINK

[72] Inventor: Nathan Swerdlow, Philadelphia, Pa.
[73] Assignee: General Electric Company
[22] Filed: Dec. 16, 1970
[21] Appl. No.: 98,697

[52] U.S. Cl. ..........................174/21 JS, 174/15 C, 174/16 B
[51] Int. Cl. .......................................................H02g 15/20
[58] Field of Search ......................174/15 C, 16 B, 68 B, 94 S, 174/88 B, 99 B, 14, 8

[56] References Cited

UNITED STATES PATENTS

| | | | |
|---|---|---|---|
| 2,992,290 | 7/1961 | Swerdlow | 174/16 B |
| 3,331,911 | 8/1967 | Whitehead | 174/22 R |
| 3,558,798 | 1/1971 | Albright | 174/11 R |

*Primary Examiner*—Darrell L. Clay
*Attorney*—J. Wesley Haubner, William Freedman, Frank L. Neuhauser, Oscar Waddell and Joseph B. Forman

[57] ABSTRACT

Discloses a liquid-cooled electric bus comprising a pair of hollow bus bar sections interconnected by a removable hollow disconnecting link. The interiors of the bus bar sections and the link are hydraulically interconnected to permit liquid coolant to flow between said bus bar sections via said link. Each bus bar section has a flow-blocking barrier therein and a bypass circuit bypassing the barrier comprising a pair of flexible lines of electrical insulating material and a shutoff valve interconnecting said lines.

5 Claims, 3 Drawing Figures

Patented Feb. 29, 1972
3,646,245
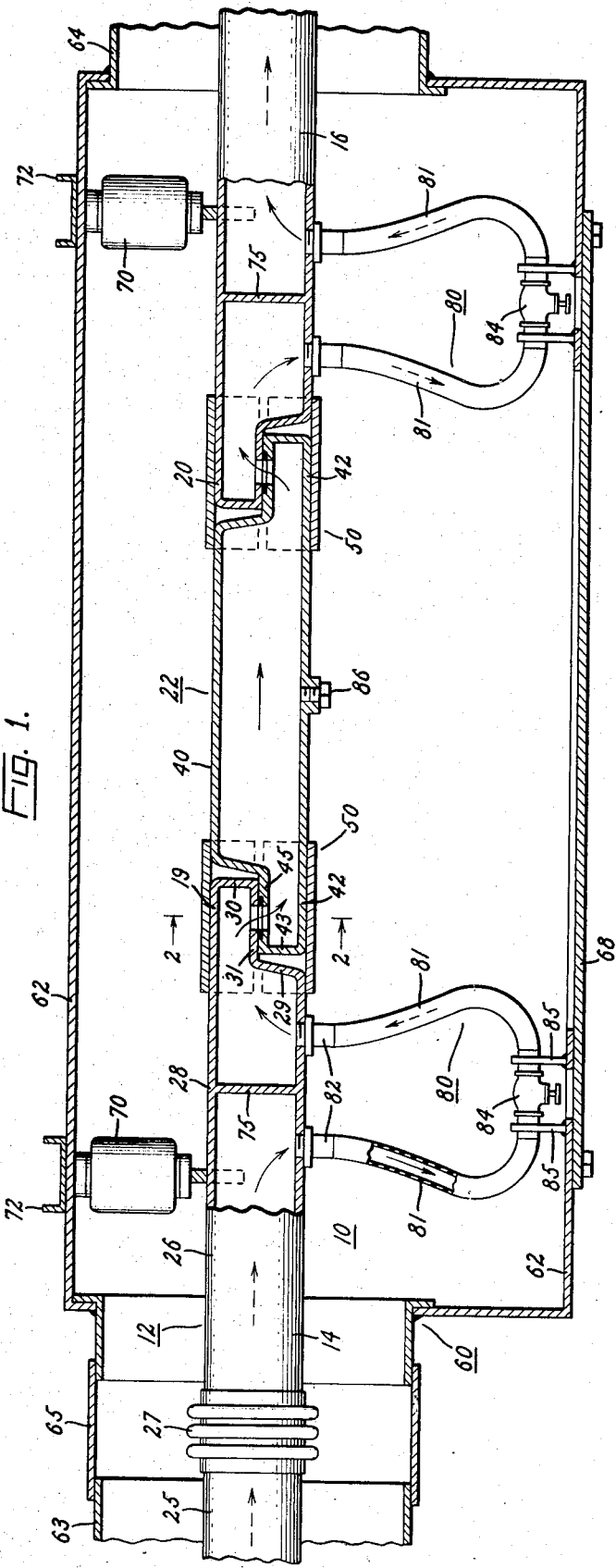
INVENTOR:
NATHAN SWERDLOW,
BY William Freedman
ATTORNEY

LIQUID-COOLED BUS CONTAINING A DISCONNECTING LINK

This invention relates to an electric bus comprising a bus bar containing a longitudinally extending passage through which liquid flows to cool the bus bar.

Bus bars must occasionally include a disconnecting link which can be opened to provide for electrical isolation between sections of the bus bar. If the bus bar is of the liquid-cooled type referred to hereinabove, the passage for the coolant should extend through the disconnect link in order to provide adequate cooling thereof. This presents a problem of how to confine the coolant when the disconnect link is opened so that leakage of the coolant is prevented.

It is possible to incorporate shutoff valves in the bus bar sections on opposite sides of the disconnect link, but such valves would have to be relatively large and of a special design in order to fit the bus bar. Also, such valves would project radially outward from the bus bar by relatively large amounts, and this would tend to unduly reduce electrical clearances.

An object of my invention is to provide, in a liquid-cooled bus containing a disconnecting link, shutoff means for the coolant which is so constructed that it can rely upon relatively small valves of a conventional design which do not unduly reduce electrical clearances.

In carrying out my invention in one form, I provide a liquid-cooled bus comprising a pair of hollow bus bar sections having end portions disposed in longitudinally spaced-apart relationship. A removable hollow disconnect link spans the space between said end portions and is releasably clamped to the end portions. The interiors of the bus bar sections and the hollow link are hydraulically interconnected to permit liquid coolant to flow between said bus bar sections via said link. Each bus bar section has a flow-blocking barrier therein and a bypass circuit bypassing the barrier for directing coolant therearound. Each of said bypass circuits comprises a pair of flexible lines of electrical insulating material and a shutoff valve hydraulically interconnecting said insulating lines.

For a better understanding of the invention, reference may be had to the following description taken in conjunction with the accompanying drawings, wherein:

FIG. 1 is a side elevational view partly in section showing a bus embodying one form of the invention. The bus comprises a disconnecting link which is shown in its closed position.

FIG. 2 is a sectional view along the line 2—2 of FIG. 1.

FIG. 3 is a side elevational view showing a portion of the structure illustrated in FIG. 1. The disconnect link is in an open position.

Referring now to FIG. 1, there is shown an electric bus 10 comprising the tubular bus bar 12. Bus bar 12 comprises a pair of axially aligned bus bar sections 14 and 16 that have their inner ends 19 and 20 axially spaced from each other. Removably connected between these inner ends 19 and 20 is a disconnecting link 22 that is adapted to carry current between the spaced bus bar sections when in its closed position shown in FIG. 1.

Each of the bus bar sections is substantially identical, and therefore only one will be described in detail. Bus bar section 14 comprises a tubular conductor portion 25 of circular cross section and a hollow terminal portion 26 axially aligned therewith. These portions 25 and 26 are electrically connected together by a flexible metal bellows 27 of tubular configuration that forms an expansion joint between portions 25 and 26. The hollow terminal portion 26 comprises a tubular body portion 28 of circular cross section with a transverse end wall 29, a tubular end portion 19 of semicircular cross section, and a transverse end wall 30 capping this end portion. The end portion 19 also includes a horizontal wall portion 31 that extends along a diameter of the terminal portion 26 between end walls 29 and 30.

The disconnecting link 22 comprises a tubular body portion 40 of circular cross section and two end portions 42 integrally joined thereto. The end portions 42 are hollow and of semicircular cross section, and each is capped by an end wall 43 at its extreme outer end. Each end portion 42 also includes a horizontal wall portion 45 that extends along a diameter of the tubular disconnect link 22. When the disconnect link is in its closed position of FIG. 1, the upper surface of this horizontal wall portion abuts against the lower surface of the horizontal wall portion 31 of the terminal portion 14 of the bus section.

For clamping the disconnect link 22 in its closed position shown in FIG. 1, a stud clamp 50 is provided for each end of the disconnecting link. As best seen in FIG. 2, the stud clamp 50 comprises two halves 51, each of generally semicircular cross section with radially extending end flanges 52. Clamping bolts 54 extend through the end flanges 52. When nuts 56 on these clamping bolts 54 are tightened, the two halves 51 are forced together, thereby forcing the end wall 45 of disconnect link 22 into high-pressure engagement with horizontal end wall 31 of the bus section.

For providing low-resistance current paths between bus section 14 and disconnect link 22, the outer cylindrical surfaces of the end portions 19 and 42 are silver plated and the inner cylindrical surfaces of the clamp 50 are silver plated. When the stud clamp 50 is tightened, these mating silver-plated surfaces are forced together in high-pressure engagement, thereby providing low-resistance conductive paths through the clamp 50 between the bus section and the disconnecting link.

For enclosing the above-described bus bar structure 12, a metal enclosure 60 at ground potential is provided. This enclosure 60 comprises a disconnecting link housing 62 surrounding in spaced relationship the disconnecting link 22 and the ends of the bus bar sections 14 and 16. Enclosure 60 also comprises tubular portions 63 and 64 respectively surrounding bus bar sections 14 and 16 in spaced relationship. A suitable removable cover 65 joins the enclosure portion 63 to the housing 62. A similar cover (not shown) is also provided in tubular portion 64. Housing 62 has its own removable cover 68, which covers a large opening in the side of the housing. When this cover is removed, access may be had to the disconnecting link 22 and the stud clamps 50.

For supporting the bus bar sections 14 and 16 within the housing 62, a pair of spaced-apart electrical insulators 70 are provided. Each of these insulators 70 is suitably attached at its upper end to a supporting beam 72 and at its lower end to one of the bus bar sections 14 or 16, as the case may be. The beams 72 are also used for supporting the housing 62, the housing 62 being suitably attached to the beams.

For cooling the bus bar 12, a liquid coolant is forced through the central passage that extends longitudinally of the tubular bus bar sections 14 and 16 and the tubular disconnect link 22. This central passage is constituted primarily by the interior of the two tubular bus bar sections 14 and 16 and by the interior of the tubular disconnecting link 22. For hydraulically interconnecting the interior of the disconnecting link with the interior of each bus bar section, registering holes 73 and 74 (FIG. 2) are provided in the mating walls 31 and 45 of these parts. An O-ring gasket 76 is mounted in a groove surrounding the hole 74 and is compressed between the contacting surfaces of walls 31 and 45 when the stud clamp 50 is tightened, thus forming a leakproof seal between these walls. Thus, when the disconnecting link 22 is in its closed position of FIGS. 1 and 2, coolant is able to flow between each bar section and the disconnecting link 22 via registering holes 73 and 74 without leakage.

Each bus bar section has an imperforate transverse barrier 75 extending across its interior passage which is capable of blocking the flow of coolant therethrough. Coolant is normally bypassed around this barrier 75 by means of a bypass circuit 80. This bypass circuit 80 comprises a pair of flexible tubes 81 of an electrical insulating material such as polytetrafluoroethylene, sold by DuPont Company under the trademark Teflon. Suitable fittings 82 couple the upper ends of these tubes 81 to transversely extending ports in the bus section located on opposite sides of the barrier 75. The lower ends of tubes 81 are hydraulically interconnected by means of a conventional manually operable valve 84. When the valve 84 is open, coolant can flow through the bypass circuit 80 around the barrier 75. The valve 84 is disposed immediately adjacent the grounded wall of housing 62, is electrically connected to this wall, and is at the same potential as the wall. Suitable metal brackets 85 support valve 84 on the wall. The insulating properties of the tubes 81 provide electrical isolation between the high-voltage bus and the grounded valve when the bus is energized. Closing a valve 84 blocks the bypass around its associated barrier 75.

To open the disconnecting link 22, the following procedure is used. First, voltage is removed from the bus bar, after which the cover 68 is removed to expose the disconnect link 22 and the valves 84. The valves 84 are then closed, and a drain plug 86 in the lower wall of disconnecting link 22 is removed. This drains coolant from the link 22 and from the extreme ends of the bus bar sections 14 and 16 which are located above the holes 73 and inwardly of the barrier 75. The drainplug 86 is then replaced. The stud clamps 50 are then loosened and slid axially of the bus bar into the retracted positions of FIG. 3 on the disconnecting link 22. Link 22 with the clamps is then removed.

To close, or replace, the disconnecting link, the following procedure is used. The link 22 is lifted into place and the clamps 50 are thereafter slid into their position of FIG. 1. The clamps are then tightened to compress the O-ring and provide electrical contact between the clamps and the bus bar sections and disconnecting link. The shutoff valves 84 are then opened to allow fluid flow. Suitable bleeder valves (not shown) are then opened to bleed any en,rapped air from the system. The bus is then ready for reenergization.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A liquid-cooled electric bus comprising:
   a. a pair of hollow bus bar sections having end portions disposed in longitudinally spaced-apart relationship,
   b. a removable hollow disconnecting link spanning the space between said end portions and providing an electrical connection therebetween,
   c. releasable means clamping said disconnecting link in engagement with said end portions,
   d. means interconnecting the interiors of said hollow bus bar sections and said hollow disconnecting link to permit liquid coolant to flow between said bus bar sections via said disconnecting link,
   e. each of said bus bar sections having a barrier therein located adjacent said disconnecting link that is adapted, when not bypassed, to block coolant from flowing longitudinally of said bus bar section,
   f. bypass circuits respectively bypassing said barriers for directing coolant around the barriers,
   g. each of said bypass circuits comprising a pair of flexible tubes of electrical insulating material and a shutoff valve interconnecting said insulating tubes, each of said shutoff valves being closable to block the bypass circuit around its associated barrier and allow the barrier to block coolant from flowing longitudinally of its associated bus bar section.

2. The bus of claim 1 in which each of said shutoff valves is at substantially ground potential when said bus bar is energized.

3. A bus as defined in claim 1 and further comprising an enclosure at ground potential enclosing said bus sections and said disconnecting link, said shutoff valves being located within said enclosure adjacent said enclosure and at substantially the potential of said enclosure.

4. The bus of claim 1 in which said interconnecting means of (d) comprises holes in said hollow disconnecting link and each of said end portions of said bus sections disposed in registering relationship.

5. The bus of claim 4 in combination with a sealing ring encircling one of said registering holes in said disconnect link and one of said end portions and providing a seal between said disconnecting link and said one end portion preventing leakage of coolant between said disconnect link and said one end portion.

* * * * *